Figure 1:
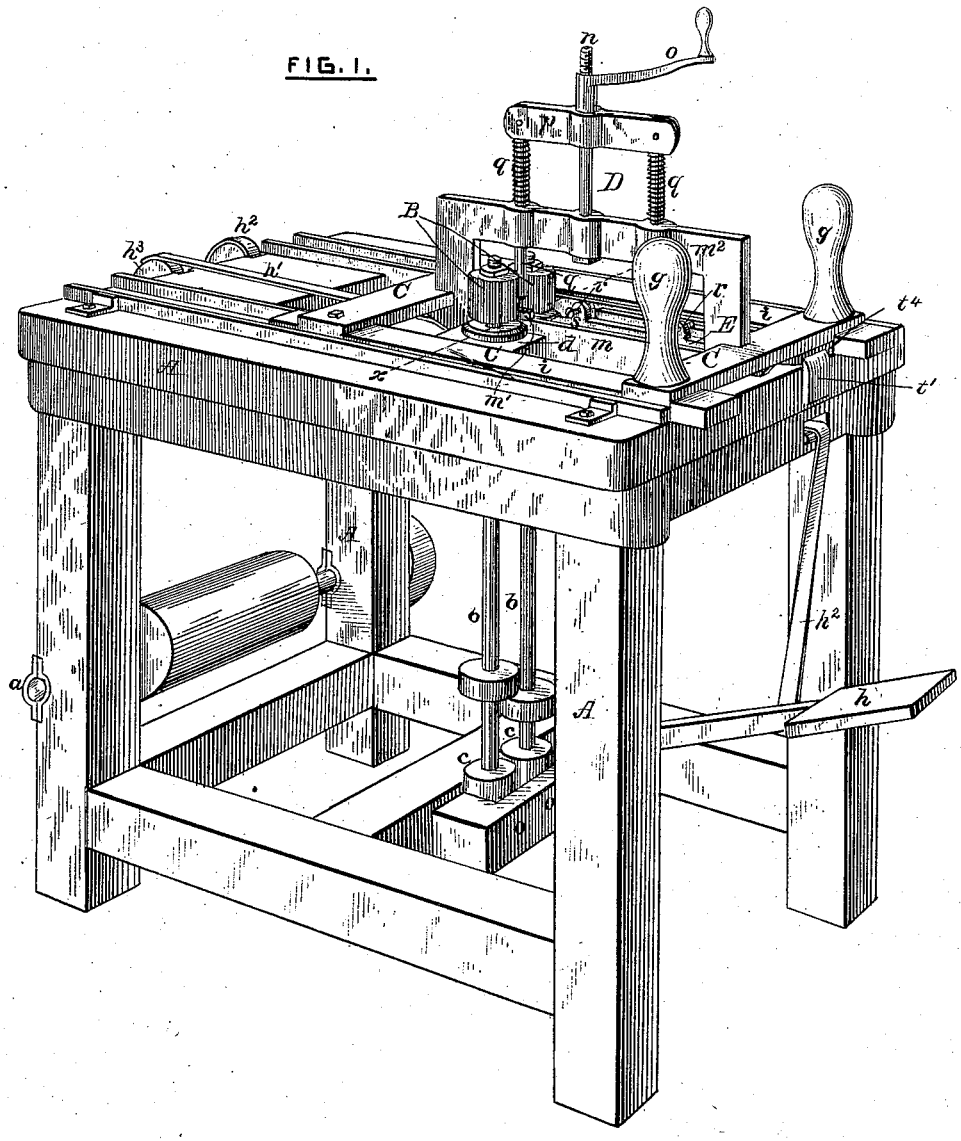

(No Model.) 3 Sheets—Sheet 1.

A. C. ESTABROOK.
MACHINE FOR MILLING BONE BLANKS FOR TOOTH BRUSHES.

No. 260,376. Patented July 4, 1882.

ATTEST:
Philip F. Larner
Nowell Bartlett

INVENTOR:
Alanson C. Estabrook
By Wm C. Ward
Attorney (No Model.)  3 Sheets—Sheet 2.
A. C. ESTABROOK.
MACHINE FOR MILLING BONE BLANKS FOR TOOTH BRUSHES.
No. 260,376.  Patented July 4, 1882.
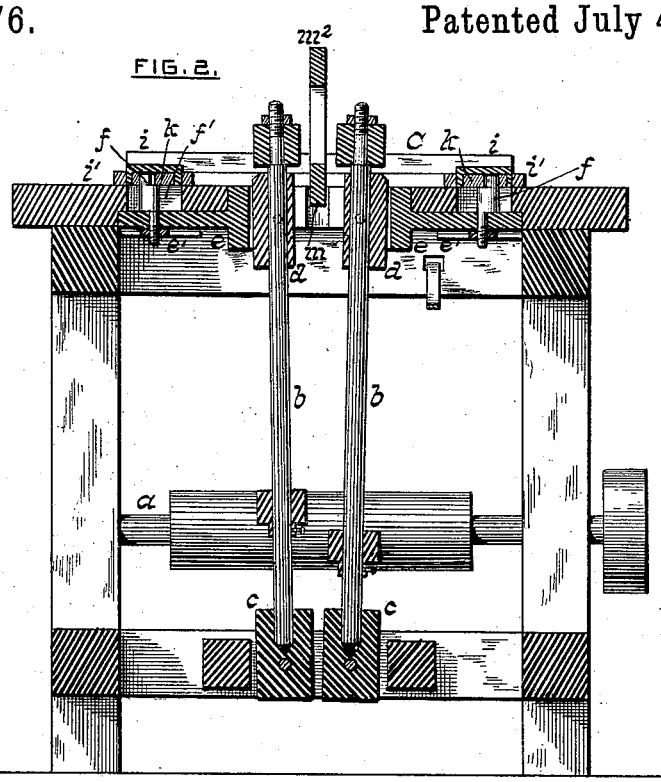
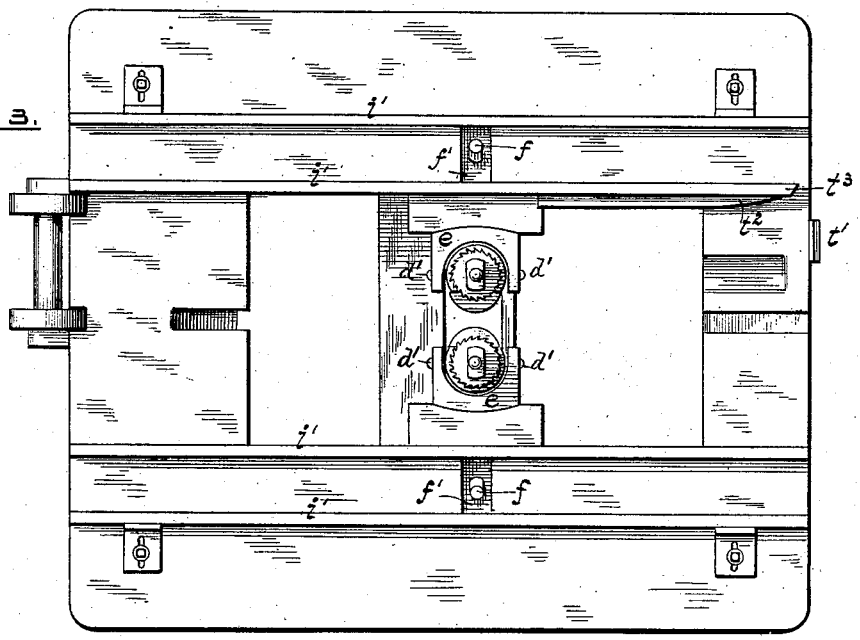
ATTEST:  INVENTOR:

(No Model.) 3 Sheets—Sheet 3.
A. C. ESTABROOK.
MACHINE FOR MILLING BONE BLANKS FOR TOOTH BRUSHES.
No. 260,376. Patented July 4, 1882.
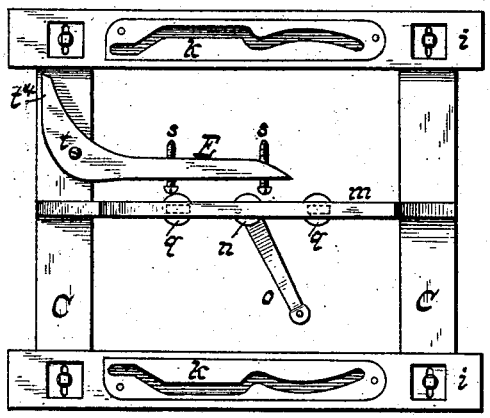
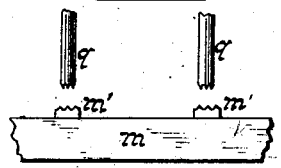
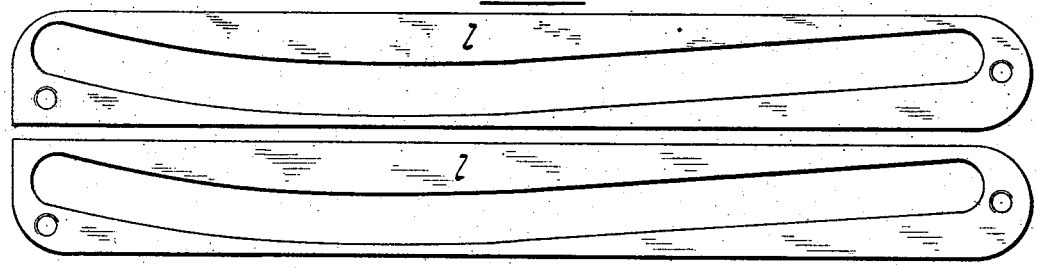
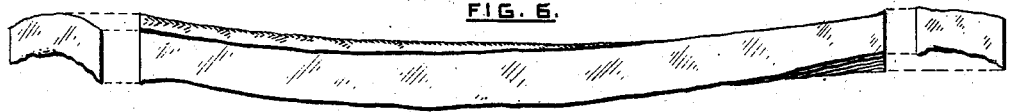
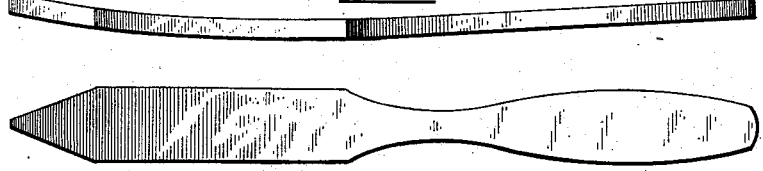
ATTEST:
Philip F. Larner
Howell Barite
INVENTOR:
Alanson C. Estabrook
By Wm C. Mod
Attorney

UNITED STATES PATENT OFFICE.

ALANSON C. ESTABROOK, OF FLORENCE, MASSACHUSETTS, ASSIGNOR TO THE FLORENCE MANUFACTURING COMPANY, OF SAME PLACE.

MACHINE FOR MILLING BONE BLANKS FOR TOOTH-BRUSHES.

SPECIFICATION forming part of Letters Patent No. 260,376, dated July 4, 1882.

Application filed December 15, 1881. (No model.)

*To all whom it may concern:*

Be it known that I, ALANSON C. ESTABROOK, of Florence, in the town of Northampton, county of Hampshire, and State of Massachusetts, have invented a certain new and useful Machine for Milling Bone Blanks for Tooth-Brushes; and I do hereby declare that the following specification, taken in connection with the drawings forming a part thereof, is a clear, true, and complete description of a machine embodying my invention.

The special object of my invention is to economically develop the edge and side contour of bone blanks for tooth-brush handles, approximating more or less closely to the contour desired in the finished handle, and to secure uniformity in each of the several styles thereof, said styles being largely governed by the variable longitudinal and peripheral contour of the original bone from which longitudinal sections are cut suitable for the production of blanks.

Heretofore in this branch of the art of bone-working, so far as my knowledge extends, skilled labor and hand-tools—such as plane, rasp, and vise—have been wholly relied upon for working the sides of the bone sections, and the same tools have been and are still largely relied upon for working the edges, although machines have heretofore been used to some extent for working said edges, and a particular description of said prior machines will hereinafter be made. The degree of hand-labor involved in making these handles prior to my invention has been so great as to render it difficult in this country to successfully compete with the products of other countries affording cheaper labor. Uniformity in goods of each of the particular styles cannot practically be attained by the hand method, because each section of bone is taken at random and worked into such style of contour as its natural formation will warrant, the workman being guided only by his eye, and as a result the handles of any one style from any one workman will materially vary in symmetry, and when compared with those from any other workman of equal skill they present still greater variations. The variable natural formation of the sections of bone, coupled with the variable lines of cut necessarily incident to the variations in the contour of the original bone, has heretofore appeared to preclude the employment of mechanism for practically superseding hand-work, except so far as relates to the operations of the prior machine for imperfectly working the edges only, as will be more fully hereinafter explained; but after a careful study of the subject I have developed the fact that the sections of bone, irregular as they are, can be so assorted and classified with reference to their natural characteristics as to form that they may be successfully and economically wholly worked by machinery with greatly improved results as to uniformity in the product.

After fully describing a machine as preferably organized by me, in connection with variations therein, which may be made without materially affecting the results sought, the features deemed novel will be specified in the several claims hereunto annexed.

My machine embodies a pair of rapidly-rotating milling-heads bodily movable independently toward and from each other, a bone-clamping device, and predetermined forms which cause the heads to be moved in harmony with the movements of the clamp, said clamp and forms being mounted upon a sliding carriage which moves in a plane at right angles to the axes of the milling-heads.

Referring to the drawings, Figure 1 is a perspective view of a machine embodying the several features of my invention. Fig. 2 is a lateral vertical section of the same on line $x$. Fig. 3 is a plan view of the same with the clamping carriage or slide removed. Fig. 4 is a view of the under side of the clamping slide or carriage, disclosing a pair of edge "forms." Fig. 5 is a plan view of a pair of forms for developing the sides of a bone blank. Fig. 6 represents in several views a bone section as prepared for operations with my machine. Fig. 7 represents in edge and top view one form of blank for a tooth-brush handle as produced by my machine. Fig. 8 is a detached side view of a portion of the clamp-bed and the clamping-fingers.

The frame A should be strongly constructed and arranged with reference to properly mounting thereon the operative mechanism, substantially as indicated in the drawings. The main shaft $a$ has a driving-pulley and a drum from which the vertical milling-spindles $b$ are belted.

The milling-heads B have cutting-edges similar to those employed in heads for milling metals, but, unlike those, these heads are composed of unhardened steel. For milling the heads of blanks the heads are preferably made twice as long as is necessary for cutting, in order that when one end is dulled the head may be turned bottom up and placed upon the opposite spindle and its opposite end used, thus lessening the labor of sharpening, as compared to sharpening heads only long enough to perform the required cutting service, it requiring but little more labor and time to sharpen the long head than it would the short one. For milling the sides of the blanks the heads are preferably somewhat larger in diameter than those for milling edges and of lesser length, because they approach more closely to each other in reducing the thickness of the blank.

It is essential that the rapidly-revolving heads be capable of independent movement toward and from each other, and this capacity may be provided for in various ways. As here shown, the vertical milling-spindles $b$ are long, and are mounted in step-boxes $c$, which are pivoted to a cross-bar in the lower portion of the frame to permit the tops of the spindles to move to and fro in a plane at right angles to the pivots. The upper boxes, $d$, are in like manner pivoted, as at $d'$, to sliding blocks $e$, which are accurately fitted to transverse guides $e'$ beneath the top of the frame, and each sliding block has a vertical stud, $f$, which projects upward through a slot, $f'$, in the top of the frame. The studs $f$ are crank-shaped and capable, by means of a shoulder thereon and a nut, of a fixed rotative adjustment in the sliding blocks, whereby said studs may be adjusted from time to time to compensate for the reduction in the diameters of the milling-heads incident to their wear in use. This adjustability of the connection between the milling-heads and the forms hereinafter described for controlling them constitutes a valuable feature.

It is important that the cutting-faces of the two milling-heads should be practically parallel with each other during their cutting service, and, as their requisite range of movement is comparatively limited, I find that good results may be obtained with the spindles thus pivoted, provided the spindles be of such length between their steps and the upper boxes that their variation from a perpendicular line will be so slight as to not materially affect the parallelism of the cutting-faces in any of their working positions. Instead of this method of mounting the spindles, each may be made quite short and provided either with a long box rigidly attached to the sliding blocks $e$, or with upper and lower boxes, respectively secured rigidly to said blocks and to rigid brackets depending therefrom. In this case, however, said blocks should be proportionally heavy, and the guides should be of such a character as would serve to not only guide, as with the pivoted steps, but also to actually support the spindles and their heads.

The milling-heads are controlled with reference to their cutting action by predetermined forms, which, although always corresponding with the longitudinal contour of a tooth-brush blank, are variably designed, according to the character of work desired. For developing the longitudinal edge contour of the bone blank, these forms are right and left hand duplicates, and cause the heads to so approach and separate from each other as to properly outline the edges of the bone blank, making both of them exactly alike, and truly located with reference to the longitudinal central line of the bone section.

For developing the upper and lower sides of the blank the forms may or may not be duplicates. If the blank is to be curved and of uniform thickness throughout, the two forms would be equally curved, and if the curved blanks were to be thicker at one end than at the other the forms would be similarly curved, but not placed parallel with each other. If one side of the blank is to have a different curvature than the other, the forms would correspondingly differ, and so on, according to the particular circumstances in each case. Although it is preferable to have machines in sufficient number to require no changing of the forms, I will describe this machine as arranged for use with forms of various kinds.

The longitudinal movement of a bone section between the milling-heads is preferably accompanied by an exactly corresponding movement of the forms, and therefore the sliding carriage or bed C is relied upon for carrying both the bone and the forms. This carriage is a rectangular frame provided with vertical handles $g$, and it is moved forward toward the cutters by means of a treadle, $h$, connected to said slide by means of bands or straps $h'$ $h^2$ and a shaft, $h^3$, and its pulleys, and is drawn rearward by the handles, which may alone be relied upon for that service, or a strap, pulley, and weight may be employed in lieu thereof in an obvious manner.

The sides $i$ of the carriage are limited to truly longitudinal movements by side guides, $i'$, on the top of the frame. The vertical studs $f$ of the sliding blocks $e$ project upward within the spaces bounded by the guides $i'$, so that they occupy proper relations to the forms $k$, which are secured to the lower surfaces of the sides $i$ or in recesses provided therein to receive them. The forms $k$ are adapted for edge work, and are therefore right and left hand duplicates, and the forms $l$, Fig. 5, are adapted for side work in developing the upper and lower sides of one variety of bone blank.

It is desirable that adjustable means be provided for securing the forms to the carriage to admit of their accurate adjustment in each case; but when separate machines are employed for each variety of form the matter of adjustability is of little consequence as between the forms and the carriage, because the outer sides of the forms may be parallel and require only plain recesses in the carriage for their reception and for securing them therein screws may be relied upon. As a rule, however, the sides $i$ of the carriage should be made adjustable with reference to each other, and the guides $i'$ should be adjustably mounted on the frame, and the studs $f$ rendered adjustable, as before described, in order to readily compensate for wear from time to time, and thereby insure accurate operation under all circumstances.

The forms shown by me consist of narrow plates of steel or iron longitudinally slotted in the lines desired, and the studs $f$ occupy these slots, so that the movement of the heads in both directions is positively assured by alternate contact of the opposite sides of the studs with the opposite sides of the slots. It is not essential that said forms should be of the slotted order, for either side surface of said slots may be relied upon for exactly assuring the proper variable relations of said heads to each other in cutting, and springs may be employed for maintaining continuous contact of the studs with their forms—as, for instance, if only the outer guiding-surfaces of my forms were used, springs or weights, straps and pulleys, would be requisite for maintaining the studs in contact therewith, or, in other words, for separating the heads; and if, on the other hand, the inner guiding-surfaces were only employed, they would require springs or weights for keeping the studs in contact with the guiding-surfaces and forcing the milling-heads to their work, and although I do not exclude myself from this latter arrangement in a double-head machine, I deem it undesirable, because the milling-heads, if operating upon a thick hard section of bone, would be forced inwardly by the springs with no more force than if the bone were thin and soft, and such variations not only exist, but a bone has sometimes hard and soft spots, and therefore when springs are thus relied upon the milling-heads are liable to vary in their operation. By having both movements of the heads positively controlled by the forms and said forms connected with the carriage-bed the movements of the heads are always in exact accord with the feeding movement of the bone to the heads, and although I prefer the forms slotted, as shown, I do not limit myself thereto, except as indicated in the claims hereunto annexed.

The irregularity in the contour of the bone sections, and the fact that in working the sides thereof the milling-heads approach each other quite closely, and that the bone is passed between the heads, together with the fact that the bone must be securely held during the milling operation, must all be considered in connection with a clamping device suitable for the purpose, and said clamping device may be variably constructed; but the clamp D has been devised by me with special reference to the conditions stated, although I do not limit myself thereto, except as indicated in the claims hereunto annexed. This clamp has a base, $m$, which is secured to the two ends of the sliding carriage C and occupies the space between the head-spindles, a little below the heads, so as to permit them to pass over the top edges thereof. The irregular contour of the bone sections will not admit of the use of an extended supporting-bed, and therefore I provide two vertical beds, $m'$, mounted centrally on the base $m$, and, say, four or five inches apart. These beds are thinner than the base, and thinner than the thinnest bone blank desired, and they are provided with sharply-serrated faces for firmly engaging with the bone.

At the two ends of the base $m$ there is supported a parallel top bar, $m^2$, upon which is rigidly mounted a vertical clamping-screw, $n$, to the upper or threaded portion of which a hand-wheel or a lever-nut, $o$, is fitted, so as to bear upon the center of a rock-bar, $p$, which is loosely mounted upon the rigid screw $n$.

At each end of the rock-bar a pendent clamping rod or finger, $q$, is pivoted, which passes downward loosely through the top bar, $m^2$, so that each rod or finger is in line with its respective bed $m'$, and between said top bar and the rock-bar $p$ each rod or finger is encircled by an expansive spiral spring having bearings upon the cross-bar. These springs serve to lift the rock-bar and fingers, when permitted so to do by the nut-lever, and in clamping they also enable either finger to be farther depressed than the other without affecting the clamping power of the nut-lever. This construction of the clamp enables a bone section, however irregular in contour or thickness it may be, to be firmly clamped between the ends of the rods or fingers $q$ and the beds $m'$. The faces of the fingers are also sharply serrated, and they correspond with the beds $m'$ in thickness, so as to offer no obstruction to the requisite inward movement of the milling-heads.

Although I prefer the clamping-screw and nut-lever, as shown, the rock-bar may be otherwise depressed—as, for instance, by a cam-lever pivoted to a vertical rod in place of the screw $n$, the cam-face of the lever having bearings upon the rock-bar, and I therefore do not limit myself to the screw and nut-lever, except as hereinafter indicated.

The milling-heads, when worked to the best advantage, should not be caused to cut too deeply. In working the sides of bone blanks the cutting is never too heavy; but in working the edges of the bone sections directly, as cut from the original bone, for instance, the extraneous quantity of bone would be generally too great for one pair of milling-heads to cut at one passage, and in such case another pair of milling-heads may be profitably employed in this machine, placed in front of those shown, and mounted in fixed boxes at such distance apart as will insure in the working of the edges such a lateral reduction of the sections as will enable them to be properly worked by the movable heads. When, however, the bone sections are thus worked it is extremely difficult to locate a section in the clamp with reference to its true longitudinal central line, owing to its variations in width and in the angles of its edges, and therefore I prefer that the bone sections be first reduced to parallelism, and that both edges shall occupy parallel planes, so that the true central line may be accurately determined in clamping the section for proper presentation to the milling-heads, and so that, each head having substantially the same work to perform, (especially in working edges,) neither will have any undue tendency to move the bone laterally in the clamp.

In working the previously-prepared sections, as preferred by me, a gage can be profitably employed for readily locating each section in the clamp, said gage being properly set for contact with one of the parallel edges of the section. This gage can be variously constructed; but it must meet the following peculiar conditions: it must co-operate with a sliding clamp, and, of necessity, must therefore occupy a line which, if projected, would pass through one of the milling-heads, and therefore said gage must be in working position when the clamp is ready to receive a section of bone, and it must not obstruct the carriage during its forward movement nor come in contact with the milling-head. The gage E has been specially devised by me in this connection; but I do not limit myself thereto, except as indicated in the claims hereunto annexed. This gage is automatic in its operation, being connected to and moving with the carriage in such a manner that when the carriage is drawn fully to the front said gage occupies its true position with reference to the clamp, and when the carriage is moved forward said gage swings outwardly and passes at its outer end beyond and to the outside of the adjacent milling-head. As here constructed the gage is in the form of a bell-crank lever, provided on top of its long arm with ears or lugs $r$, transversely bored and tapped for the reception of horizontal gage-screws $s$, the heads of which constitute the contact-points with which the edge of the bone section is to engage. At the angle of the bell-crank lever it is pivoted, as at $t$, to the under side of the end of the carriage. Its vibrating movements are effected by a vertical stud, $t'$, at the end of the frame of the machine, for throwing the gage into working position when the rear edge of the short arm of the lever is brought into contact therewith, and by a curved surface at $t^2$, on the side of the adjacent carriage-guide $i'$, against which said short arm bears at its end for throwing the gage out of working position and out of line with the adjacent milling-head as the carriage advances.

It is obviously important that when the gage occupies its gaging position it should be rigidly held against lateral displacement, and this is provided for by having the front end, $t^3$, of the curved surface $t^2$ in such relation with the vertical stud $t'$ that the end of the short arm $t^4$ will, when the slide is drawn fully forward, be confined between said stud and the front end of the plate which affords the curved surface $t^2$, and the end $t^3$.

It is not necessary that the gage move forward with the carriage, so long as it offers no obstruction to said forward movement, and if the gage should be moved in a vertical plane it would serve a good purpose, and this can readily be provided for by having said gage mounted at its rear end upon a horizontal rock-shaft, and having said shaft provided with a pinion in engagement with a rack-bar depending from the lower side of the base $m$ of the clamp, and various other constructions can readily be devised, although I prefer that shown and described.

The mode of working the machine will require but little additional description. A bone section, having been properly located by the gage, is securely clamped. The carriage is then moved forward by the pressure of the foot upon the treadle, presenting the bone longitudinally to the milling-heads, which move toward and from each other in exact harmony, and proportioned in said movements to the rapidity of movement by the slide. The bone having been carried beyond the heads, the slide is then moved rearward and the blank removed from the clamp, the gage meantime swinging outwardly and then returning to its proper position.

The prior machine for milling the edges of bones, hereinbefore referred to, and with which I am familiar, embodied a single milling-head on a horizontal arbor mounted in a vertically-sliding frame. Beneath the arbor and the head it had a sliding carriage traveling at right angles to the arbor and carrying a clamp which engaged laterally with the side of a bone section when placed therein. Between the clamp and the vertically-sliding frame was a one-sided form, standing edgewise, and upon the edge of this form the vertically-sliding frame, the head, and its arbor were supported by means of a laterally-projecting stud provided with a friction-roller bearing on the form. In this machine the milling-head, in cutting, rested upon the bone, except when supported by the form, and therefore, as practically worked, the lines cut thereby varied more or less, according to the dullness and sharpness of the head-cutters, the variable density of different parts of the same bone or of different bones, and the variable bulk of extraneous bone, due to the different widths of the bone-sections, as well as to their great variations in thickness. One edge having been worked in said machine, the bone is turned over for presenting its opposite edge; but when finished the edges are not uniform, nor in cross-section do they occupy parallel planes, because the clamp employed in said machine was so constructed and arranged that it tilted the bone one way or the other, because of the irregular contour of its sides against which the clamp engaged, and said clamp was incapable of so clamping the bone that it could rest flatly on the previously-worked edge.

It is to be understood that I herein make no claim to a machine having but one milling-head, except it also embody novel features of my own invention; and also that I make no claim to the combination, with a milling-head, of a spring or weight for moving said head to its work; but, so far as my knowledge extends, I am the first to organize a bone-milling machine wherein a milling-head is positively moved to its work, and thereby enabled to operate with absolute uniformity, regardless of the variable conditions hereinbefore indicated; and I am the first to conceive and demonstrate the importance of absolute uniformity in the contour of bone blanks for tooth-brush handles as a valuable factor in economically and readily performing subsequent finishing operations.

I am well aware that in machines for jointing barrel-staves, and also in other lines of wood-working, rotary cutter-heads and milling-heads have heretofore been employed in connection with forms of various kinds, and with gages, sliding carriages, and means for properly holding or confining the material during its presentation to the action of the heads; but I know of no prior organization of such mechanism in any manner suited to or capable of performing the special service herein indicated, and I therefore limit the several features of my invention to mechanism devised and constructed with special reference to the working of bone into blanks for tooth-brushes.

Having thus described my invention, I claim as new and desire to secure by Letters Patent—

1. The machine for shaping bone blanks for tooth-brushes, embodying in combination, substantially as hereinbefore described, the two rapidly-revolving milling-heads adapted to bone-cutting and movably mounted with relation to each other, the bone-holding clamp having the beds and clamping-fingers, a pair of forms corresponding to the longitudinal contour of a tooth-brush blank for variably moving the heads toward each other, and a sliding carriage on which said clamp and forms are mounted.

2. The combination, substantially as hereinbefore described, of the pair of milling-heads, their spindles mounted in pivoted steps, and pivoted upper boxes, the sliding blocks in which said upper boxes are pivoted, the forms, the clamp, and the carriage on which said forms and clamp are mounted.

3. The combination, substantially as hereinbefore described, of the pair of milling-heads adapted to bone-working, the forms having the contour of a tooth-brush blank, the clamp for holding the bone, a sliding carriage on which the clamp and forms are mounted, and a gage for properly locating the bone in the clamp.

4. The combination, substantially as hereinbefore described, of the pair of milling-heads, the clamp, the sliding carriage, the gage, and means, substantially as described, for enabling the carriage during its sliding movement to move the gage into and away from its gaging position.

5. The combination, with the frame of the machine, provided with a stud and curved surface, of the sliding carriage and the gage, in the form of a bell-crank lever and pivoted to said carriage substantially as described, whereby when the carriage is moved forward the gage is swung sidewise out of gaging position and returned and locked during the backward movement of said carriage, as set forth.

6. The combination of the pair of milling-heads adapted to bone-cutting and movable with relation to each other, the forms, having a contour corresponding to the longitudinal contour of a tooth-brush blank, a bone-clamp, a carriage for said forms and clamp, and a treadle for moving the carriage forward, substantially as described.

7. The combination, with the bone-milling heads and the carriage, of the clamp-base, two elevated beds thereon, a pair of clamping-fingers, a rock-bar to which said fingers are pivoted, and a clamping-lever for bearing centrally upon the rock-bar, substantially as described, whereby both fingers may be equally forced in line with the elevated beds upon a bone regardless of its curvature and variable thickness.

8. The combination, with the bone-milling heads and the sliding carriage, of the clamp-base, the clamping-fingers, the rock-bar, the screw, and the nut-lever, substantially as described.

9. The combination of the pair of bone-milling heads, the bone-clamp, having the beds and clamping-fingers and passing between the heads, the forms having the contour of a tooth-brush blank, and the adjustable connections between said forms and the milling-heads, substantially as described.

ALANSON C. ESTABROOK.

Witnesses:
PHILIP F. LARNER,
HOWELL BARTLE.